(12) United States Patent
Seta et al.

(10) Patent No.: US 6,985,619 B1
(45) Date of Patent: Jan. 10, 2006

(54) DISTANCE CORRECTING APPARATUS OF SURROUNDINGS MONITORING SYSTEM AND VANISHING POINT CORRECTING APPARATUS THEREOF

(75) Inventors: Itaru Seta, Tokyo (JP); Keiji Hanawa, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 754 days.

(21) Appl. No.: 09/667,534

(22) Filed: Sep. 22, 2000

(30) Foreign Application Priority Data

Sep. 22, 1999 (JP) .............................. P. 11-268015
Sep. 18, 2000 (JP) .......................... P. 2000-281266

(51) Int. Cl.
*G06K 9/00* (2006.01)

(52) U.S. Cl. .......................... 382/154; 345/419; 356/12
(58) Field of Classification Search ................ 382/154, 382/103, 104, 106, 202, 285, 291, 294; 348/113, 348/139, 140, 135, 116, 118, 148; 356/3, 356/614, 12, 14; 345/419
See application file for complete search history.

(56) References Cited

U.S. PATENT DOCUMENTS

| | | | | |
|---|---|---|---|---|
| 5,410,346 A | * | 4/1995 | Saneyoshi et al. ........... 348/116 |
| 5,825,915 A | * | 10/1998 | Michimoto et al. .......... 382/154 |
| 6,163,337 A | * | 12/2000 | Azuma et al. ................. 348/43 |
| 6,385,334 B1 | * | 5/2002 | Saneyoshi et al. ........... 382/154 |

FOREIGN PATENT DOCUMENTS

| | | | |
|---|---|---|---|
| JP | 06341837 A | * | 12/1994 |
| JP | 10307352 A | * | 11/1998 |

OTHER PUBLICATIONS

Saneyoshi et al., 3-D Image Recognition System for Drive Assist, IEEE 1993, pp. 60-65.*
Saneyoshi, 3-D Image Recognition System by Means of Stereoscopy Combined with Ordinary Image Processing, IEEE 1994, pp. 13-18.*
Weiss et al., An Error Analysis for Surface Orientation from Vanishing Points, IEEE 1990, pp. 1179-1185.*
Bellutta et al., "3D Visual Information from Vanishing Points," IEEE 1989, pp. 41-49.*

* cited by examiner

*Primary Examiner*—Samir Ahmed
(74) *Attorney, Agent, or Firm*—Smith Gambrell & Russell LLP

(57) ABSTRACT

A distance correcting apparatus of a surroundings monitoring system includes a stereo imaging means for stereoscopically taking a pair of images of a frontal scenery, a parallax calculating means for calculating a parallax based on the pair of images, a distance calculating means for calculating a distance to an object based on the parallax and a parameter for correcting distance, an approximation line calculating means for calculating a plurality of approximation lines extending in the distance direction in parallel with each other based on the images, a vanishing point calculating means for calculating a vanishing point of the images from a point of intersection of the approximation lines and a parameter correcting means for correcting the parameter based on the calculated vanishing point.

16 Claims, 14 Drawing Sheets

DISTANCE CORRECTING APPARATUS OF SURROUNDINGS MONITORING SYSTEM AND VANISHING POINT CORRECTING APPARATUS THEREOF

BACKGROUND OF THE INVENTION

1. Field of the Invention

The present invention relates to a distance correcting apparatus of a surroundings monitoring system for correcting distance information containing errors caused by a positional deviation of a stereoscopic camera and to a vanishing point correcting apparatus of the system.

2. Discussion of the Background Art

In recent years, a stereoscopic surrounding monitoring apparatus using a pair of left and right cameras, that is, a stereoscopic camera, having solid image element like CCD mounted on a vehicle and the like has been watched by concerned engineers. To detect a distance to an object, first respective pixel blocks having coincidence of brightness are found in left and right images (stereo matching), then distance data are calculated according to the principle of triangulation from a parallax, namely a relative deviation amount, between both pixel blocks. Consequently, in order to calculate distance data with high reliability, it is desirable that there exists no positional deviation other than the parallax in a pair of left and right images (stereo images). In actual world, however, the stereoscopic camera has some amount of positional errors such as horizontal or vertical deviations (parallel deviations), a rotational deviation and the like, caused when the camera is installed on a vehicle and the like. Particularly, the horizontal deviation directly produces an error in an parallax and as a result the distance calculated based on the parallax differs from a real one.

With respect to this, Japanese Patent Application Laid-open No. Toku-Kai-Hei 10-307352 discloses a technology in which the positional deviation of the stereoscopic camera is corrected by applying a geometric transformation to the stereoscopic image. That is, when an initial adjustment of the positional deviation is made or when a readjustment of the positional deviation generated by aged deterioration is made, a dedicated correction detecting device is connected with an image correction apparatus performing the affine transformation to calculate the difference of angle of view, a rotational deviation or a parallel deviation of the stereoscopic image obtained by imaging a specified pattern for adjustment and to establish (reestablish) parameters of the affine transfomation according to the result of the calculation. The positional deviation is equivalently corrected by applying the affine transformation to images based on thus established affine parameters.

However, according to the aforesaid prior art, a special adjustment pattern is imaged by the stereoscopic camera and the deviation is corrected based on the position of the pattern in images. Accordingly, when the correction is performed, it is necessary to interrupt the ordinary surroundings monitoring control and as a result this prior art is not suitable for a real time processing in which the monitoring control is carried out concurrently.

SUMMARY OF THE INVENTION

It is an object of the present invention to provided a surroundings monitoring apparatus capable of correcting a parallax including errors, in particular, an error caused by horizontal deviation, in parallel with a surroundings monitoring control. It is further object of the present invention to provide a surroundings monitoring apparatus in which the accuracy of measuring distance is raised by using the corrected parallax. It is another object of the present invention to provide a surroundings monitoring apparatus in which, when three-dimensional information of an object is obtained using a vanishing point established beforehand, the accuracy of three-dimensional information of the object is raised by correcting this vanishing point.

To achieve these objects, a distance correcting apparatus of a surroundings monitoring system, comprises a stereo imaging means for stereoscopically taking a pair of images, a parallax calculating means for calculating a parallax based on the pair of images, a distance calculating means for calculating a distance to an object based on the parallax and a parameter for correcting the distance, an approximation line calculating means for calculating a plurality of approximation lines extending in the distance direction in parallel with each other based on the images, a vanishing point calculating means for calculating a vanishing point of the images from a point of intersection of the approximation lines and a parameter correcting means for correcting the parameter based on the vanishing point.

DETAILED DESCRIPTION OF THE PREFERRED EMBODIMENT

Figure 1:
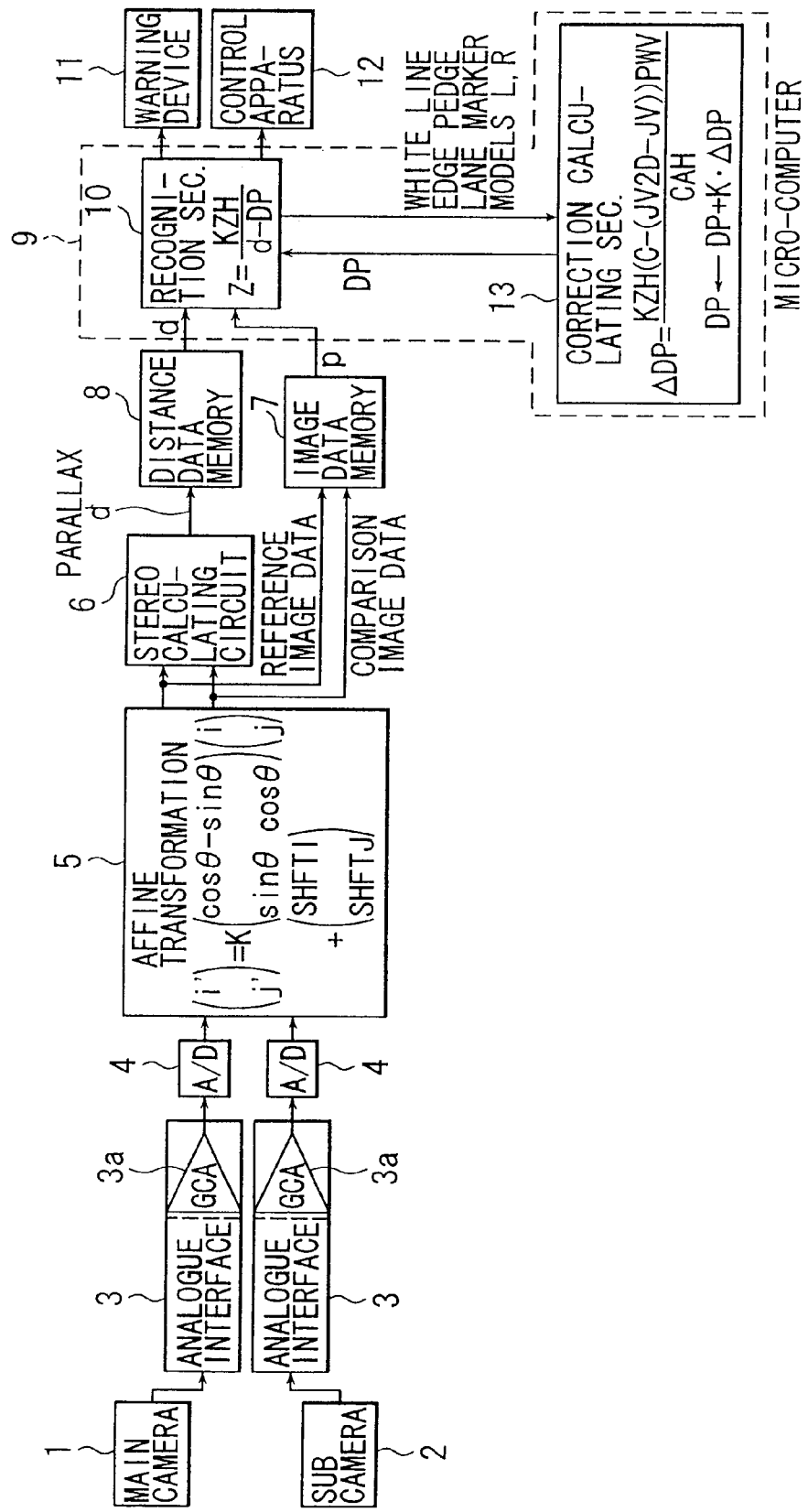
FIG. 1 is a block diagram showing a construction of a stereoscopic type vehicle surroundings monitoring apparatus according to a first embodiment of the present invention.

FIG. 1 is a block diagram of a stereoscopic type surroundings monitoring apparatus using an adjusting apparatus concerned with the embodiment. A stereoscopic camera for imaging a surrounding scenery of a vehicle is composed of a pair of cameras 1, 2 incorporating an image sensor such as CCD and the like and mounted in the vicinity of a room mirror of the vehicle. The cameras 1, 2 are mounted at a specified interval in the transversal direction of the vehicle. A main camera 1 is for obtaining a reference image data and is mounted on the right side when viewed in the traveling direction of the vehicle. On the other hand, a sub camera 2 is for obtaining a comparison image data and is mounted on the left side when viewed in the traveling direction of the vehicle. In a state of the cameras 1, 2 synchronized with each other, analogue images outputted from the respective cameras 1, 2 are adjusted in an analogue interface 3 so as to coincide with an input range of circuits at the latter stage. Further, the brightness balance of the images is adjusted in a gain control amplifier (GCA) 3a of the analogue interface 3.

The analogue image signals adjusted in the analogue interface 3 are converted into digital images having a specified number of brightness graduations (for example, a grayscale of 256 graduations) by an A/D converter 4. Respective data digitalized are subjected to an affine transformation in a correction circuit 5. That is, the positional error of the stereoscopic cameras 1, 2 which is caused when the cameras 1, 2 are installed, generates deviations in stereoscopic images such as a rotational deviation, parallel deviation and the like. The error is equivalently corrected by applying the affine transformation to the images. In this specification, a term "affine transformation" is used for comprehensively naming a geometrical coordinate transformation including rotation, movement, enlargement and reduction of images. The correction circuit 5 applies a linear transformation expressed in Formula 1 to original images using four affine parameters θ, K, SHFTI and SHFTJ.

$$\begin{pmatrix} i' \\ j' \end{pmatrix} = K \begin{pmatrix} \cos\theta & -\sin\theta \\ \sin\theta & \cos\theta \end{pmatrix} \begin{pmatrix} i \\ j \end{pmatrix} + \begin{pmatrix} SHFTI \\ SHFTJ \end{pmatrix}$$ [Formula 1]

where (i, j) is coordinates of an original image and (i', j') is coordinates after transformation. Further, affine parameters SHFTI, SHFTJ mean a transference in a "i" direction (horizontal direction of image), a transference in a "j" direction (vertical direction of image), respectively. Further, affine parameters θ, K indicate a rotation by θ, an enlargement (reduction in case of |K|<1) by K times, respectively. The affine transformation applied to the stereoscopic image assures a coincidence of the horizontal line in both images, which is essential for securing the accuracy of the stereo matching. The hardware constitution of the correction circuit 5 is described in Japanese Patent Application Laid-open No. Toku-Kai-Hei 10-307352. If necessary, the reference should be made to the disclosure.

Thus, through such image processing, the reference image data composed of 512 pixels horizontally and 200 pixels vertically are formed from output signals of the main camera 1. Further, the comparison image data having the same vertical length as the reference image and a larger horizontal length than the reference image, for example composed of 640 pixels horizontally and 200 pixels vertically, are formed from output signals of the sub camera 2. The coordinate system i-j of image on a two-dimensional plane has an origin at the left below corner of the image, an i coordinate in the horizontal direction and a j coordinate in the vertical direction. One unit of the coordinate system is one pixel. These reference image data and comparison image data are stored in an image data memory 7.

A stereo calculating circuit 6 calculates a parallax d based on the reference image data and the comparison image data. Since one parallax d is produced from one pixel block constituted by 4×4 pixels, 128×50 parallax data are calculated per one reference image of a frame size. In calculating a parallax di of a given pixel block in a reference image, first a corresponding pixel block of a comparison image is identified by searching an area having the same brightness as that given pixel block of the reference image. As well known, the distance from the camera to an object projected in a stereo image is expressed as a parallax in the stereo image, namely a horizontal deviation amount between the reference and comparison images. Accordingly, in searching the comparison image, the search is performed on the same horizontal line (epipolar line) as a j coordinate of the reference image. In the stereo calculating circuit 6, the correlation is evaluated for every pixel block between the object pixel block and the searching pixel block while shifting a pixel one by one on the epipolar line (stereo matching).

The correlation between two pixel blocks can be evaluated for example using a city block distance which is one of well known evaluation methods. The stereo calculating circuit 6 obtains a city block distance for every area (having the same area size as the object pixel block) existing on an epi-polar line and identifies an area whose city block distance is minimum as a correlation object of the object pixel block. The deviation amount between the object pixel block and the identified correlation object equals to a parallax di. The hardware constitution for calculating the city block distance and the method of determining the correlation object is disclosed in Japanese Patent Application No. Toku-Kai-Hei 5-114009. If necessary, the reference should be made to the disclosure. The parallax d calculated by the stereo calculating circuit 6 is stored in the distance data memory 8.

The micro-computer 9 or when seeing it from a functional point of view, a recognition section 10 which is a functional block, read image data of a reference image out from an image data memory 7 and recognizes an object (for example, a preceding vehicle and the like) projected in the reference image using a known image recognition technique. Further, the recognition section 10 calculates a distance Z to the object according to the following formula parameterizing a parallax d read out from the distance data memory 8.

$$Z = KZH / (d - DP)$$ [Formula 2]

where KZH is a constant (base line length of camera/horizontal angle of view) and DP is a vanishing point parallax. In this embodiment, the vanishing point parallax DP is a parallax correction value (variable) which is calculated in a correction calculating section 13.

Further, the recognition section 10 performs a recognition of road configurations. Road configurations, that is, left and right lane markers (passing line, no passing line and the like)

are expressed in a three-dimensional space as functions having parameters established so as to coincide with actual road configurations such as straight roads, curved roads or up-and-down roads. In this embodiment, a term "lane marker" represents a continuous white line-like marker drawn on a road, although the present invention is not limited to such lane markers. The method of calculating a lane marker model according to this embodiment will be described by reference to FIG. 12.

First, a white line edge Pedge, namely, a portion showing a large variation in brightness, is identified. The white line edge Pedge is searched separately for the left side and right side of a lane, respectively. A plurality of left white line edges Pedge1 and a plurality of right white line edges Pedge2 are identified respectively. Specifically, the brightness edges satisfying following three conditions are recognized as white line edges Pedge.

(Conditions of White Line Edge)

1. Brightness variation is larger than a specified value and pixels on the outer side (edge side of image) have a larger brightness than those on the inner side (central side of image).

Figure 12:
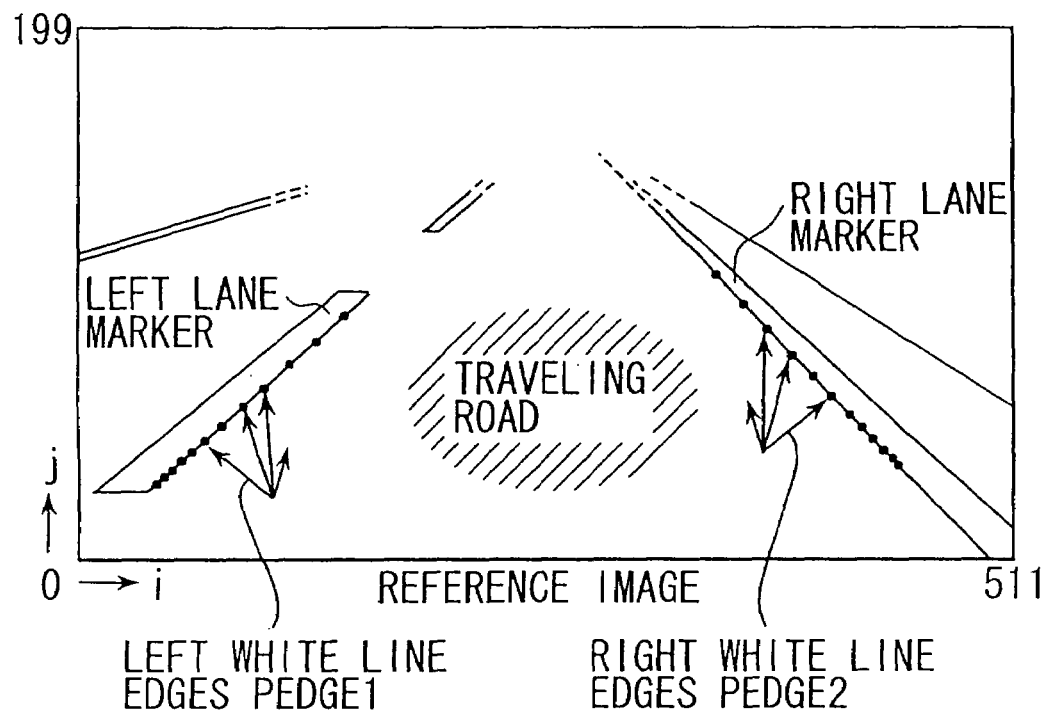
FIG. 12 is a diagram for explaining lane marker edges of a reference image.

The white line edges Pedge caused by the left and right lane markers are brightness edges at the boarder of lane marker and paved surface, as shown in FIG. 12.

2. With respect to candidates of the white line edge Pedge satisfying the condition 1, another edge exists outside of one edge on the same horizontal line as the candidates and brightness of pixels on the inner side is larger than that of pixels on the outer side.

Since the lane marker has a specified width, there is another boarder on the outer side of the white line edge Pedge. This condition is provided in view of the feature of lane marker.

3. With respect to pixel blocks including the white line edge Pedge satisfying the condition 1, a parallax d has been calculated.

If there is no parallax d where a white line edge exists, the white line edge Pedge is not effective for recognizing a road configuration.

The recognition section 10 calculates coordinates (X, Y, Z) in real space by substituting coordinates (i, j) and its parallax d for every identified white line edge Pedge into the following Formula 3 and Formula 4.

$$Y = CAH - Z(JV - j)PWV \qquad \text{[Formula 3]}$$

$$X = r/2 + Z(IV - i)PWH \qquad \text{[Formula 4]}$$

where CAH is an installation height of cameras 1, 2; r is an interval between cameras 1, 2; PWV and PWH are a vertical and horizontal angle of view per one pixel, respectively; IV and JV are an i coordinate and j coordinate of a vanishing point V established, respectively.

Further, the coordinate system in real space comprises an origin placed on the road surface immediately beneath of the center of the cameras 1, 2, X axis extending in the widthwise direction of the vehicle, Y axis extending in the vertical direction of the vehicle and Z axis extending in the longitudinal direction of the vehicle. When the coordinates (i, j) and the parallax d of an object (a preceding vehicle, a solid object, a road and the like) projected on the image are identified, the coordinates (X, Y, Z) of the object in real space can be unconditionally identified according to the transformation formulas shown in Formulas 2 through 4.

Figure 11:
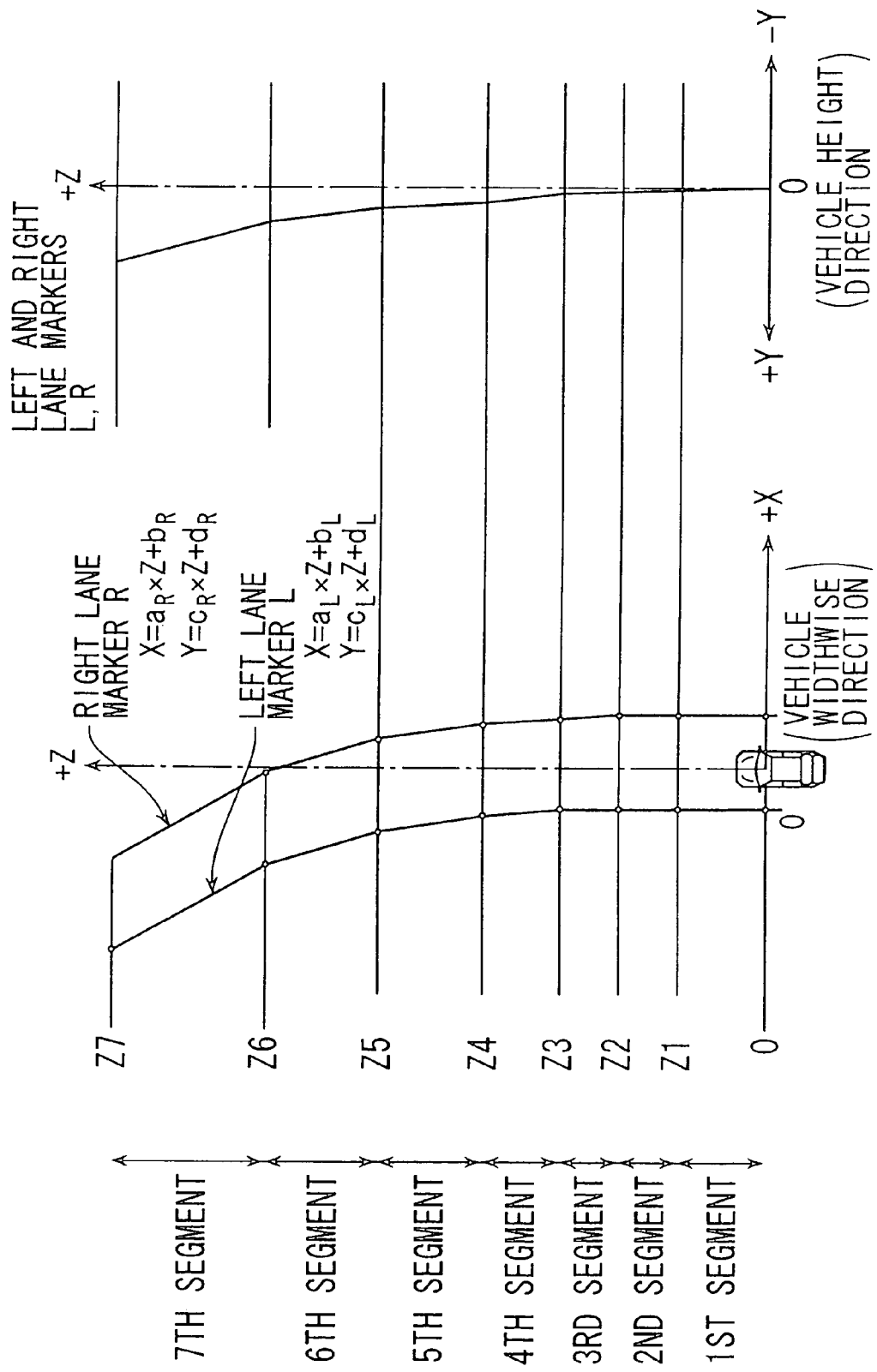
FIG. 11 is a diagram showing an example of a lane marker model.

A lane marker model is identified based on the coordinates (X, Y, Z) of thus identified respective white line edges Pedge in real space. The lane marker model is prepared in such a manner that approximation lines are obtained for every specified interval with respect to each of the left and right white line edges Pedge1, Pedge2 within a recognition range (for example, a range of 84 meters away in front of the vehicle from camera) and thus obtained approximation lines are combined like broken lines. FIG. 11 shows an example of a lane marker model in which the recognition range is divided into seven segments and the left and right white line edges Pedge1, Pedge2 for each segment are approximated to a linear equation expressed as follows according to the least square method.

(Left lane marker model L) [Formula 5]

$$X = a_L \cdot Z + b_L$$

$$Y = c_L \cdot Z + d_L$$

(Right lane marker model R)

$$X = a_R \cdot Z + b_R$$

$$Y = c_R \cdot Z + d_R$$

These lane marker models L, R are constituted by a curve function (X=f(Z)) for expressing a curvature of road and a gradient function (Y=f(Z)) for expressing a gradient or condition of unevenness of road. Accordingly, the three-dimensional feature of the road in real space can be expressed by the left and right lane marker models L, R. Respective white line edges and left and right lane marker models L, R calculated in the recognition section 10 are transmitted to a correction calculating section 13.

The recognition section 10 actuates a warning device 11 such as a display monitor or a speaker when it is judged that a warning is needed based on the result of recognition of preceding vehicles or road configurations. Further, the recognition section 10 controls a control device 12 to carry out miscellaneous vehicle controls such as engine output control, shift control of automatic transmission, brake control and the like.

Figure 8:
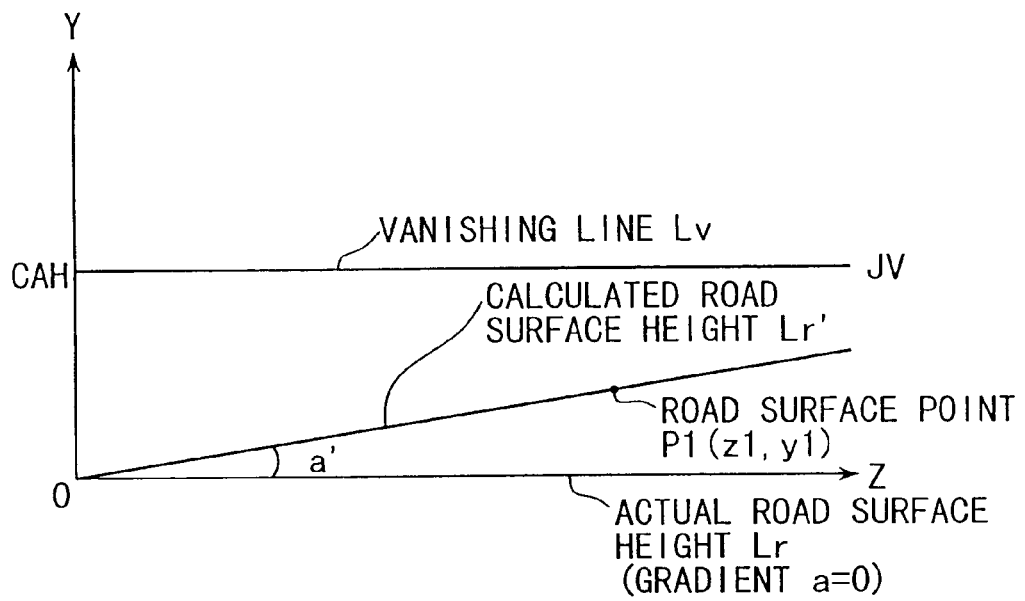
FIG. 8 is a diagram for explaining a calculated road height.

Next, the method of correcting distance information according to the embodiment will be briefly described by reference to FIG. 8.

Assuming that the Z axis of the vehicle is always horizontal with respect to an even road without up-and down, that is, there is no pitching of the vehicle, the height Y of the road surface is expressed by a line Lr with a gradient a (a=0). This line Lr is called an actual road surface height. Letting coordinates of a point p1 (hereinafter referred to as a road surface point) projected on the reference image be (i1, j1) and letting its parallax be d1, the position of this road surface point p1 in real space is identified unconditionally as coordinates (x1, y1, z1).

$$z1 = KZH/(d1 - DP) \qquad \text{[Formula 6]}$$

$$y1 = CAH - z1(JV - j1)PWV \qquad \text{[Formula 7]}$$

$$x1 = r/2 + z1(IV - i1)PWH \qquad \text{[Formula 8]}$$

In case where a flat road without up-and-down horizontally exists, if the distance z1 calculated from the parallax d1 includes no error, the height y1 calculated from Formula 7 should be 0. That is, if the value of the distance z1 is identical to an actually measured value, a line Lr' (hereinafter, referred to as a calculated road surface height) connecting an origin and the road surface point p1 agrees with the actual road surface height. Namely, the gradient of the calculated road surface height Lr' becomes 0. On the other hand, in case where the value of the distance z1 contains errors and differs from the actually measure value, the height y1 calculated from Formula 7 is not equal to 0, the calculated road height Lr' having a specified gradient $$a'(a' = y1/z1 \neq 0).$$

The reason why the calculated height y1 is not equal to 0 is that the parallax d1 containing errors due to the effect of the horizontal deviation of the stereoscopic camera is calculated and these errors are not properly offset by the vanishing point parallax DP (corresponding to a parallax correction value). Hence, if a deviation amount of the gradient a' (a'≠0) of the calculated road surface height Lr' with respect to the gradient a of the actual road surface height Lr is known, a deviation amount ΔDP between the proper value of the vanishing point parallax DP and the current value can be calculated.

First, in case where the vanishing point parallax DP is an optimum vale enough to be able to completely offset the errors, the gradient value of the calculated road surface height Lr' (agrees with the the gradient of the actual road surface height Lr) is a. Accordingly, the gradient a is expressed based on Formula 6 and Formula 7 which have been described as follows:

$$a = \frac{y1}{z1} \qquad \text{[Formula 9]}$$
$$= \frac{CAH}{KZH}(d1 - DP) - (JV - j1)PWV$$

On the other hand, in case where the vanishing point parallax is a value DP' which deviates from the proper value DP, the gradient a' of the calculated road surface height Lr' is expressed in the following formula:

$$a' = \frac{y1}{z1} \qquad \text{[Formula 10]}$$
$$= \frac{CAH}{KZH}(d1 - DP') - (JV - j1)PWV$$

Eliminating d, j based on the formulas 9 and 10, following formula is obtained:

$$a - a' = \frac{CAH}{KZH}(DP' - DP) \qquad \text{[Formula 11]}$$

Transforming the formula 11 to obtain DP–DP', that is, the deviation amount ADP of the vanishing point parallax:

$$\Delta DP = DP - DP' \qquad \text{[Formula 12]}$$
$$= \frac{KZH}{CAH}(a' - a)$$

The gradient a of the actual road height Lr is 0. On the other hand, the gradient a' of the calculated road height Lr' can be identified based on the parameter c of the lane marker model L, R (Y=c. Z+d) calculated in the recognition section. Similarly to the gradient a' of the calculated road surface height Lr', when the horizontal deviation of the stereoscopic camera exists, the error caused by the deviation effects on the lane marker model L, R. Hence, letting the mean value of parameters cL, cR of the left and right lane marker model L, R up to a predetermined distance (for example a range from 0 to Z2) be C, it is possible to regard this value C as a gradient a' of the calculated road surface height Lr'. Further, substituting a=0, a'=C into the formula 12, the deviation amount ADP of the vanishing point parallax is expressed by the following formula finally:

$$\Delta DP = \frac{KZH}{CAH}C \qquad \text{[Formula 13]}$$

As seen from the formula 13, the result of multiplying the parameter C by a constant (KZH/CAH) is the deviation amount ΔDP of the vanishing point parallax. Hence, by adding the deviation amount ΔDP to the vanishing point parallax DP, the calculated road surface height Lr' can be made identical to the actual road height Lr (a'=a=0. That is, the error of the parallax d caused by the horizontal deviation of the stereoscopic camera can be eliminated by using the vanishing point parallax DP properly established based on the deviation amount ΔDP calculated according to the formula 13. As a result, even in a case where a horizontal deviation of the stereoscopic camera exists, an accurate distance Z can be calculated by properly establishing the vanishing point parallax DP which is a parallax correction value.

The description above is based on a premise that the flat road without up-and-down is always horizontal with respect to Z-axis. However, in practice, an actual road surface height L of the flat road does not always agree with Z-axis due to the affect of the pitching motion of the own vehicle. For example, when the own vehicle directs upward (sky side), the gradient a of the actual road surface height Lr becomes a negative value and when the own vehicle directs downward (ground side), the gradient a of the actual road surface height Lr becomes a positive value. When the gradient a of the actual road height Lr is rendered to be 0 as mentioned before, the deviation amount ADP itself has an error due to the effect of pitching. From the view point of improving the accuracy of a calculated distance, it is necessary to properly calculate the gradient a of the actual road surface height Lr.

"A vanishing point" is identified based on a two-dimensional (i-j plane) positional information of the left and right lane markers in the reference image and then a gradient a of the actual road surface height Lr is calculated from this "vanishing point". Here, the term "vanishing point" is defined to be an infinitely far point (infinite point), that is, a point where all parallel lines extending in the depth (distance) direction converge at the infinite far image. For example, when a rectangular parallelepiped disposed in a three-dimensional space is mapped through a camera on a two-dimensional plane, the parallel lines constituting the rectangular parallelepiped always meet together at a point. This point of intersection is "a vanishing point". In the vehicle surroundings monitoring apparatus for imaging the frontal scene, this example corresponds to a case where the left and right lane markers on respective road sides run ahead in parallel with each other in the depth (distance) direction of the image. Since the left and right lane markers are in parallel with each other, the left and right lane markers in the picture image are approximated to straight lines respectively, letting the intersection of these lines be a vanishing point V2d (IV2D, JV2D).

Figure 13:
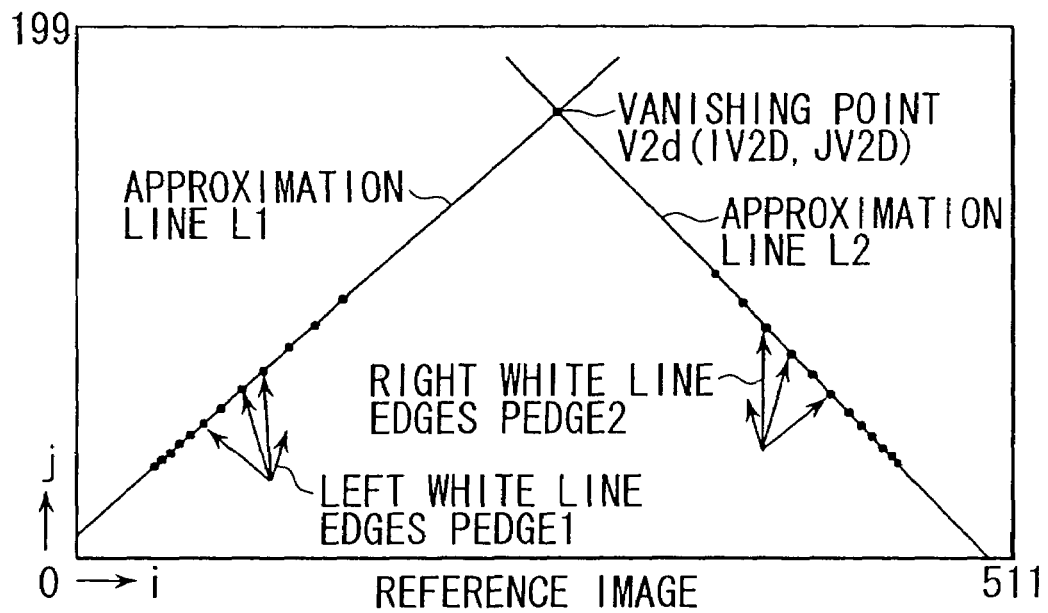
FIG. 13 is a diagram for explaining a calculation method of a vanishing point in a reference image.

Specifically, as shown in FIG. 13, a plurality of left white line edges Pedg1 are approximated to a straight line to obtain an approximation line L1 and similarly a plurality of right white line edges Pedg2 are approximated to a straight line to obtain an approximation line L2. In order to raise the accuracy in calculating the vanishing point JV2D, it is preferable that only the white line edges within a specified range of distance (for example, 0 to Z2) are used for calculating the approximation line. The range of distance, if it is too short, the accuracy of the approximation lines L1, L2 and if it is too long, the amount of calculations increases or there is a decreasing chance of the lane marker projected on the line, that is, it is difficult to create the condition of lane marker suitable for calculating the vanishing point JV2D. The intersection of these approximation lines L1, L2 is a vanishing point V2d. The gradient a of the actual road surface height Lr can be identified if the j-coordinate JV2D is known. Accordingly, in the description hereinafter, the j-coordinate JV2D of the vanishing point V2d is referred to as "actual vanishing point" for the purpose of discriminating from the established vanishing point JV.

Figure 9:
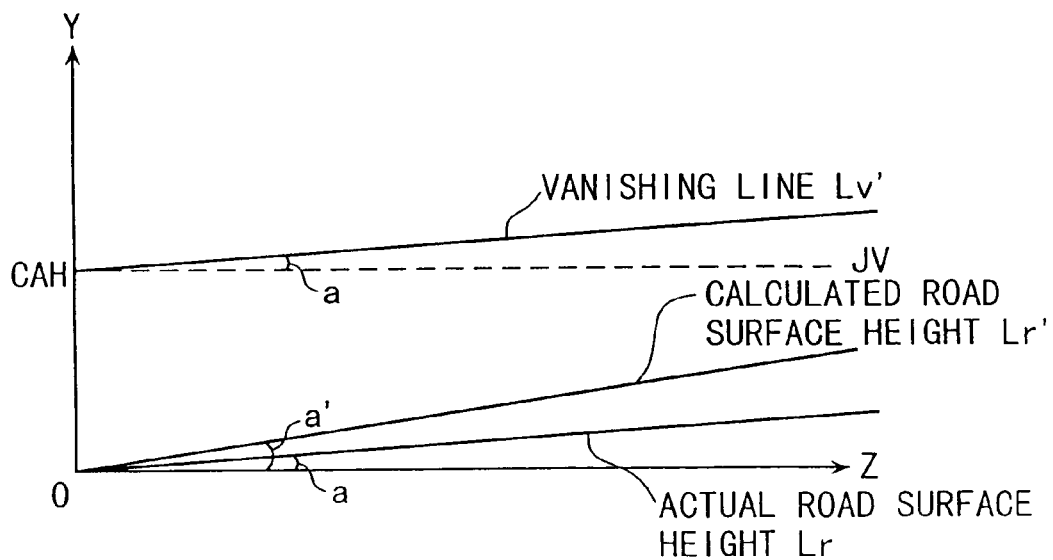
FIG. 9 is a diagram showing a relationship between a calculated road height and an actual road height.

FIG. 9 is a diagram showing the relationship between the actual road surface height Lr and the calculated road surface height Lr'. The stereoscopic camera is mounted on the vehicle in such a manner that the vanishing line Lv connecting the installation height CAH of the camera and the actual vanishing point JV2D is in parallel with the actual road surface height Lr. In case where the own vehicle generates pitchings, the gradient of the actual road surface height Lr varies and at the same time the gradient of the vanishing line Lv also varies. That is, regardless of the existence or nonexistence of the pitching of the own vehicle, the gradient of the actual road surface height Lr always agrees with that of the vanishing line Lv (both gradients are a). That is to say, even in case where the vehicle has a pitching motion, the vanishing line Lv is always in parallel with the actual road surface height Lr. Consequently, the gradient of the actual road surface height Lr can be identified by obtaining the gradient a of the vanishing line Lv. If this gradient a is known, the vanishing point parallax DP can be calculated by transforming the formula as follows.

First, after substituting the vanishing point JV2D into a variable j of the formula 3, obtaining the gradient (Y/Z) on Z-Y plane:

$$a = (JV2D - JV)PWV \qquad \text{[Formula 14]}$$

As seen from the formula, if the actual vanishing point JV2D is identified, the gradient a (corresponding to the gradient of the actual road surface Lr) height of the vanishing line Lv is identified unconditionally.

Substituting the formula 14 into the formula 12, finally the following formula can be obtained:

$$\Delta DP = \frac{KZH}{CAH}C - \frac{KZH}{CAH}(JV2D - JV)PWV \qquad \text{[Formula 15]}$$

The formula 15 is obtained by subtracting a portion affected by the pitching as a correction term from the formula 13. The correction term is obtained by multiplying the product of substituting the established vanishing point JV from the actual vanishing point JV2D by a predetermined constant KZH/CAH. Accordingly, if the current value of the vanishing point parallax DP is added by the deviation amount $\Delta$DP, regardless of the existence or nonexistence of pitching of the own vehicle, the gradient a' of the calculated road surface height Lr' always agrees with the gradient a of the actual road surface height Lr. This means that the error caused by the horizontal deviation of the stereoscopic camera is offset by the vanishing point parallax DP and the distance Z is calculated as being actually measured. The effect of pitching of the own vehicle exerts not only on the gradient a of the vanishing line Lv (and the actual road surface height Lr) but also on the gradient a' of the calculated road surface height Lr'. However, the deviation amount $\Delta$DP is calculated such that the effect of pitching with respect to the gradient a and the effect of pitching with respect to the gradient a' are mutually offset (refer to the formula 12). Accordingly, an accurate deviation amount $\Delta$DP can be calculated without being affected by pitching of the vehicle.

Next, the detailed description of the parallax correction according to this embodiment will be made by reference to flowcharts shown in FIG. 2 and FIG. 3.

The correction calculating section 13 updates the value of the vanishing point parallax DP according to a series of steps and this value is fed back to the recognition section 10. The flowcharts are executed repeatedly per cycle.

First, at a step 1, the correction calculating section 13 reads white line edges Pedge and lane marker models L, R calculated in the recognition section 10 of a reference image. Next, at steps 2 through 6, it is evaluated whether or not the reference image is in a suitable condition for calculating the vanishing point JV2D. First, at a step 2, it is judged whether or not the left and right lane markers exist in the reference image which is an object of calculating the vanishing point JV2D. That is, this can be judged by investigating whether or not the left and right lane marker models L, R have been calculated in the recognition section 10. Further, this may be judged by investigating whether or not the left white line edges Pedge1 and the right white line edges Pedge2 have been calculated. At the step 2, in case where the judgment is negative, that is, in case where the left and right lane markers exist nowhere, since mutually parallel lines have not extracted, the vanishing point JV2D can be calculated. Hence, in order to maintain the safety of the control, the program goes to RETURN without changing the current value of the vanishing point parallax DP and the execution of this flowchart in the present cycle finishes. On the other hand, at the step 2, in case where the judgment is positive, the program goes to a step 3.

At the step 3, the reliability of the left and right lane markers are verified. Specifically, following two things are evaluated.

1. In case where the difference between the position of the lane marker in the previous cycle and the position of the lane marker in the present cycle is greater than a specified value, it is judged that the lane marker has a low reliability. Specifically, in case where the position of the white line edge Pedge detected in the previous cycle largely deviates from the position of the white line edge Pedge detected in the present cycle, the lane marker is judged to have a low reliability.

2. It is verified how far the lane marker extends in the depth direction of an image. The lane marker has at least some extent of length. Accordingly, taking the shift of the lane marker between frames into consideration, in case where the lane marker does not extend longer than a specified length, it is judged that this lane marker has a low reliability.

After that, at a step 4, it is judged whether or not the lane marker is reliable and only when it is judged to be reliable, the program goes to a step 5. On the other hand, when it is judged that the lane marker can not be relied, the program goes to RETURN without changing the value of the vanishing point parallax DP.

At the step 5, the linearity of the lane marker is evaluated. In order to calculate an accurate vanishing point JV2D, it is necessary that the left and right lane markers extend in line. That is, it is impossible to calculate an accurate vanishing point JV2D from curved lane markers. Hence, only in case where it is judged at a step 6 that the lane marker is a straight line, The program goes to a step 7 and otherwise the program goes to RETURN without changing the value of the vanishing point parallax DP.

The linearity of the lane marker can be evaluated for example based on a lane marker model (curve function X=f(Z)) calculated in the recognition section 10. Describing by reference to FIG. 11, first a gradient A1 (mean value of gradients $a_L$, $a_R$ obtaining the gradient a of the vanishing point Lv just means calculating a gradient a of the actual road surface height.

Next, at a step 10, a gradient a' of the calculated road surface height Lr' is calculated. As mentioned before, the gradient a' is a parameter C calculated from the left and right lane marker models L, R.

Figure 4:
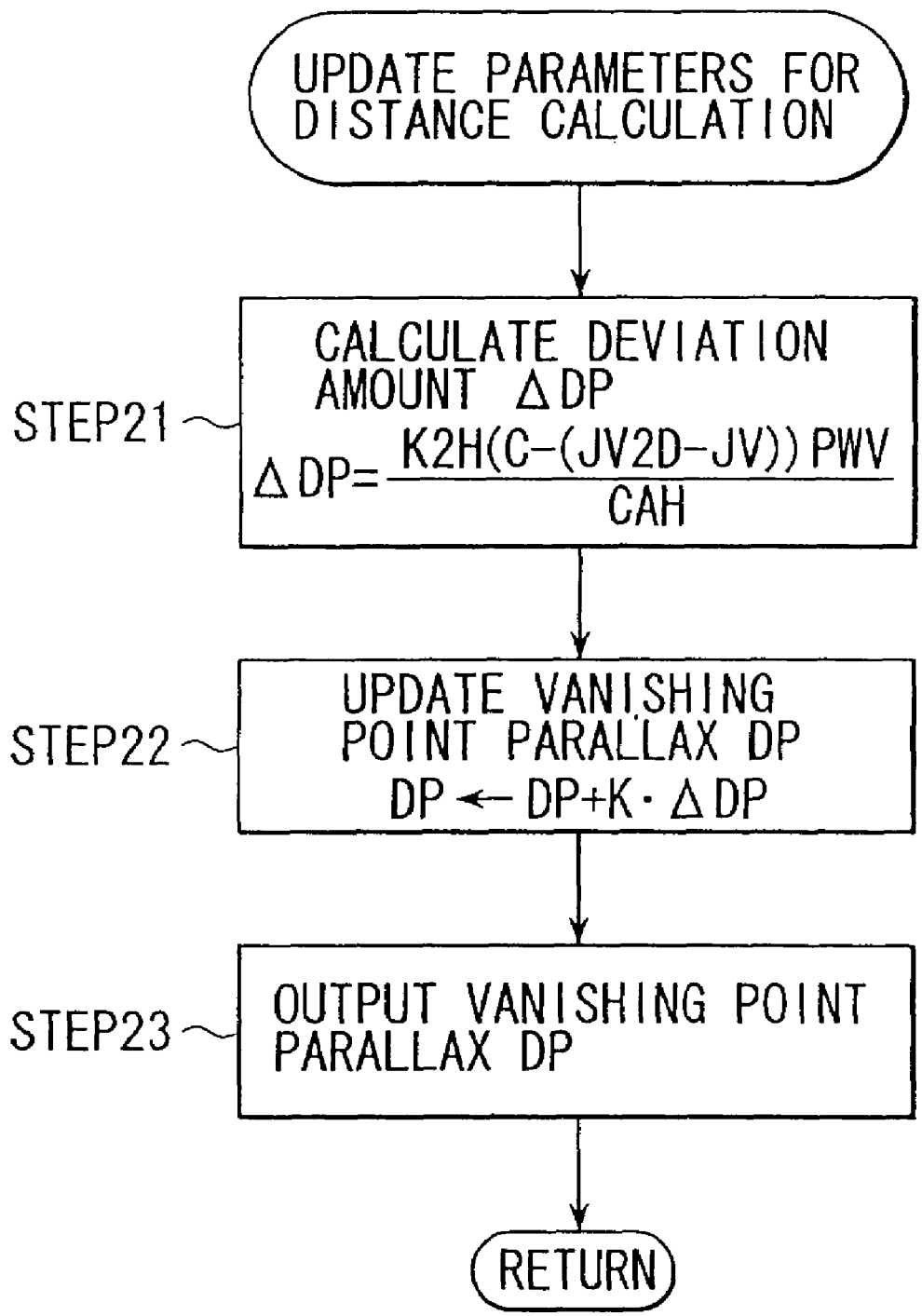
FIG. 4 is a flowchart showing steps for updating a parallax correction value DP according to a first embodiment.

At a step 11, the correction of parallax, namely, an up-dating of the vanishing point parallax DP is performed. FIG. 4 is a flowchart showing steps for up-dating the vanishing point parallax DP. First, at a step 21, a deviation amount ΔDP is calculated by substituting the parameter C and the vanishing point JV2D into the formula 15.

At a step following the step 21, in order to secure the safety of control, the up-dating process of the vanishing point parallax DP is performed using a proportional control. That is, the value of the vanishing point parallax DP is up-dated by adding an value the deviation amount ADP calculated at the step 21 and multiplied by a proportional constant k(0<k<1) to the present value of the vanishing point parallax DP. Further, at a step 23, the up-dated vanishing point parallax DP is outputted to the recognition section 10 and the execution of this flowchart in the present cycle finishes.

The aforesaid flowchart is carried out in consecutive cycles. Therefore, even if such a situation that the vanishing point parallax DP is out of a proper value, occurs, the vanishing of left and right lane markers L, R, respectively) of the curve function within a specified distance range (for example 0 to Z2) on Z-X plane, is calculated. The gradient A1 is a mean value of a gradient a1 in the first segment and a gradient a2 in the second segment. Next, a gradient A2 of the curve function within a specified distance range located ahead (for example Z2 to Z4) is calculated. The gradient A2 is is a mean value of a gradient a3 in the third segment and a gradient a4 in the fourth segment. Then, a difference (absolute value) between the gradients A1 and A2 is obtained. If the difference is smaller than a threshold value, it is judged that the lane marker is a straight line.

Steps after the step 7 are related to an up-dating of the vanishing point parallax DP. First, at the step 7, an approximation line L1 of a plurality of left white line edges Pedge1 existing within a specified range (for example, 0 to Z2) is calculated according to the least square method (refer to FIG. 13). Similarly, an approximation line L2 of a plurality of left white line edges Pedge2 existing within that range is calculated according to the least square method.

At a step 8 following the step 7, as shown in FIG. 13, an point of intersection of the approximation lines L1, L2 is determined to calculate the vanishing point JV2D of the reference image. Further, at a step 9, a gradient a of the vanishing line Lv is calculated by substituting the vanishing point JV2D calculated at the step 8 into the formula 14. As described above, point parallax DP gradually comes close to a proper value by carrying the flowchart out repeatedly. Hence, since the error of the distance Z caused by the horizontal deviation of the stereoscopic camera is gradually offset, the gradient a' of the calculated road surface Lr' converges to the gradient a of the actual road surface height Lr.

According to the steps described above, the optimization of the vanishing point parallax DP proceeds in parallel with the normal monitoring control and even in case where the horizontal deviation of the stereoscopic camera occurs, the distance can be always calculated accurately. Accordingly, even in case where the position of the stereoscopic camera is changed from the initial position by aged deterioration of the camera or shocks applied to thereto, highly reliable distance information can be obtained stably. The highly reliable distance information provides surroundings monitorings with a reliability.

Further, the left and right lane markers existing on both sides of the road are used as mutually parallel lines extending in the depth direction and needed for the calculation of the vanishing point JV2D of the reference image. In this embodiment, it is judged whether or not the lane marker is suitable for calculating the vanishing point JV2D by evaluating the linearity of the lane marker or the positional relationship of the lane marker between frames. Further, only when it is judged that the lane marker is suitable, the value of the vanishing point parallax DP or the parallax correction value is changed. Hence, since an inappropriate vanishing point JV2D can be prevented from being calculated, this providing further stable, highly reliable distance information.

In the above description, the updating of the vanishing point parallax is performed by the proportional control, however, the updating may be performed by the statistic control. For example, preparing a histogram composed of 1000 samples of the deviation amount ADP of the vanishing point parallax, a most frequently observed value may be used as a deviation amount ΔDP. This up-dating process according to the statistical control can be can be applied to a second, third, and fourth embodiments.

Second Embodiment

According to the second embodiment, the parallax correction value DP is updated based on the comparison relationship between the gradient a of the actual road surface height Lr (that is, gradient a of the vanishing line Lv) and the gradient a' (that is, the parameter C identified from the lane marker models L, R) of the calculated road surface height Lr'. The steps of up-dating are the same as those shown in the flowcharts of FIGS. 2 and 3. A portion different from the first embodiment is the step 11 of FIG. 3, that is, a part where the distance calculation parameter is updated.

Figure 5:
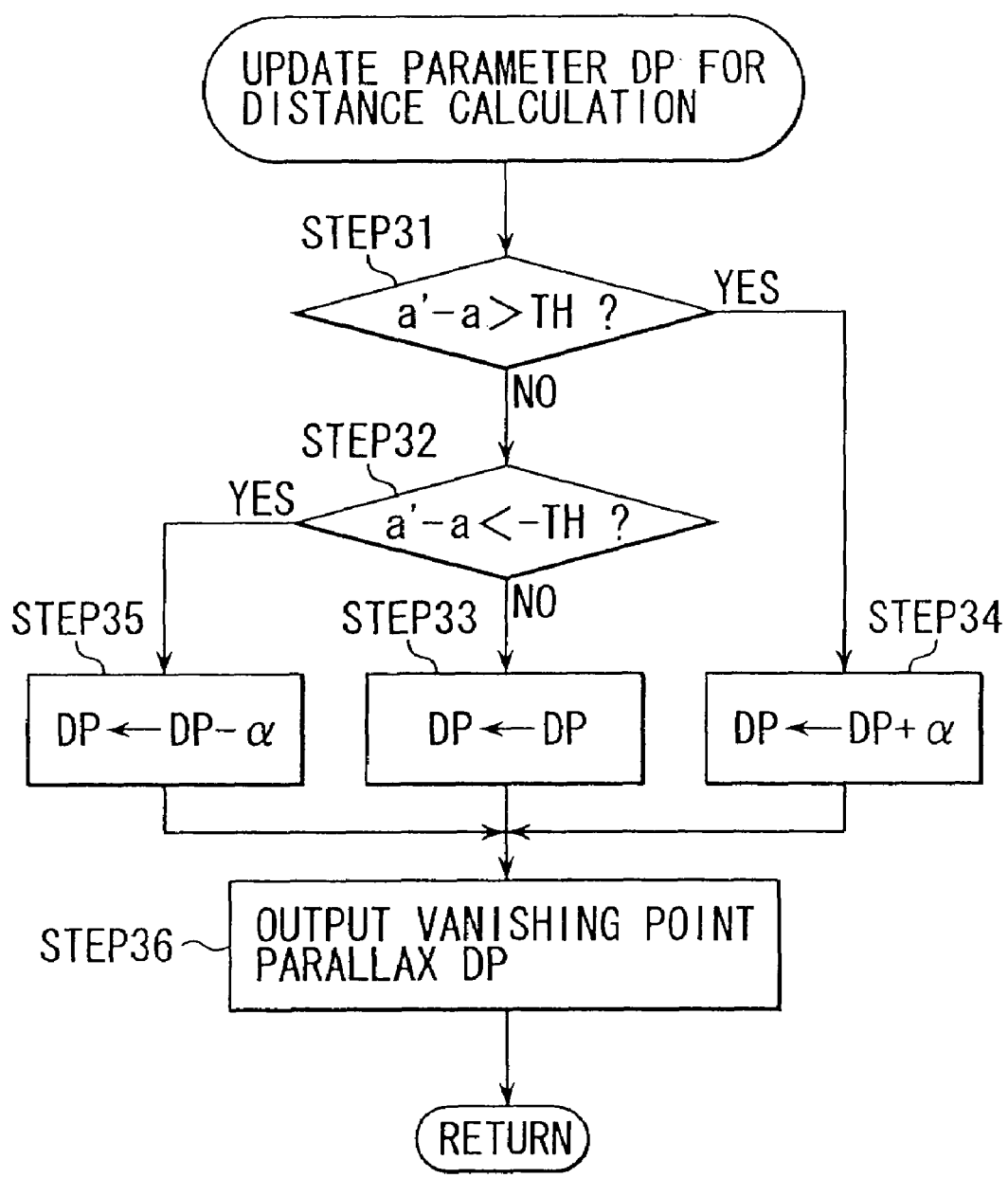
FIG. 5 is a flowchart showing steps for updating a parallax correction value DP according to a second embodiment.

FIG. 5 is a flowchart showing up-dating steps of the parallax correction value DP according to the second embodiment. First, at a step 31, it is judged whether or not the product of subtracting the gradient a of the actual road surface height Lr from the gradient a' of the calculated road surface height Lr', is larger than a positive threshold value TH. In case where the positive judgment (YES) is made at the step 31, the program goes to a step 34 where a specified value a is added to the present value of the vanishing point parallax DP and at a step 36 a larger vanishing point parallax DP than a previous one is outputted to the recognition section 10. On the other hand, in case of NO at the step 31, the program goes to a step 32.

At the step 32, it is judged whether or not the subtraction of the gradient a from the gradient a' is smaller than a negative threshold value −TH. In case of Yes at the step 32, at a step 34, the specified Cr is reduced from the present value of the vanishing point parallax DP. Accordingly, at a step 36, a smaller vanishing point parallax DP than the previous one is outputted to the recognition section 10. On the other hand, in case of NO at the step 32, that is, in case where the subtraction a'-a is within a range from the negative threshold value −TH to the positive threshold value TH, the value DP is not changed based on the judgment that the vanishing point parallax DP is proper to maintain the control stability.

Figure 10:
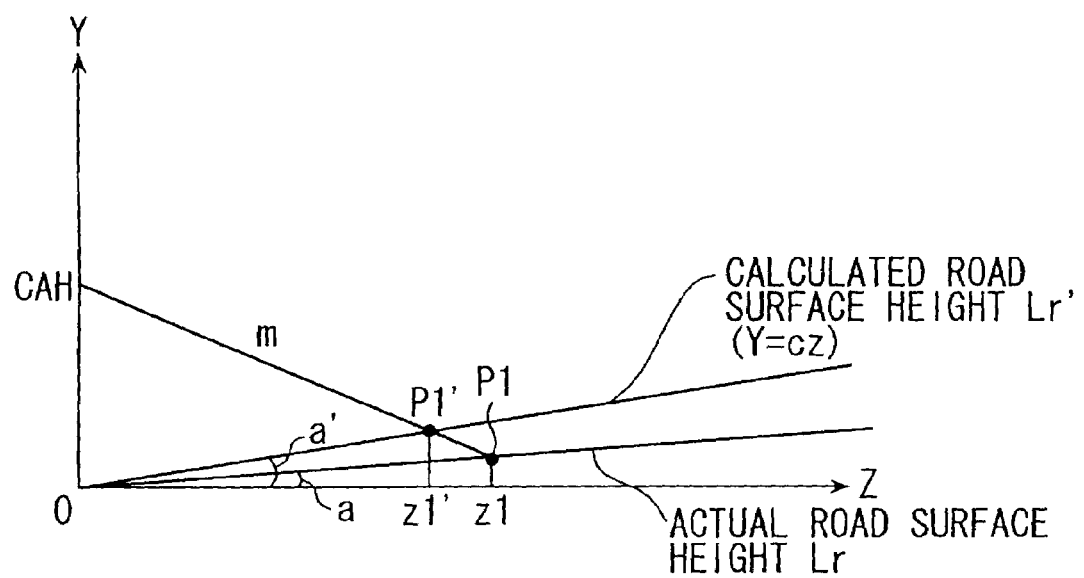
FIG. 10 is a diagram for explaining a deviation caused by the difference between an actual road height and a calculated road height.

The relationship between the difference of the gradient a' of the calculated road surface height Lr' from the gradient a of the actual road surface height Lr and the distance Z, will be described by reference to FIG. 10.

Letting the distance to a road surface point P1 be z1, and letting the gradient of the actual road surface height Lr passing through the road surface point P1 be a, when the distance z1' (containing an error) is calculated, a road surface point P1' on Z-X plane appears on a line m connecting the installation height of the camera CAH and the original road surface point P1. Accordingly, it is understood that as the calculated distance z1' becomes smaller than the actual distance z1, the gradient a' of the calculated road surface height Lr' becomes larger than the gradient a of the actual road surface height Lr. From this point of view, in case of a'>a, the calculated distance z1' should be adjusted so as to increase and for that purpose the value of the vanishing point parallax DP should be increased (see the formula 2). Inversely, in case of a'<a, the calculated distance z1' should be adjusted to become small and for this purpose the value of the vanishing point parallax DP should be decreased.

Even in case where the vanishing point parallax DP is not proper, that value gradually comes close to the proper value by carrying out the aforesaid flowchart in respective cycles. Hence, since the error of the distance Z caused by the horizontal deviation of the stereoscopic camera is gradually offset by the vanishing point parallax DP, the gradient a' of the calculated road surface height Lr' converges to the gradient a of the actual road surface height Lr. As a result, also in this embodiment, a highly accurate distance can be obtained stably. Further, as a result of performing the monitoring control based on thus obtained distance, the reliability of the vehicle surroundings monitoring can be enhanced.

Third Embodiment

The feature of this embodiment is that an affine parameter SHFT1 (shift in horizontal direction) in the affine transformation is updated according to the difference between the gradient a' of the calculated road surface height Lr' and the gradient a of the actual road surface height Lr.

Figure 6:
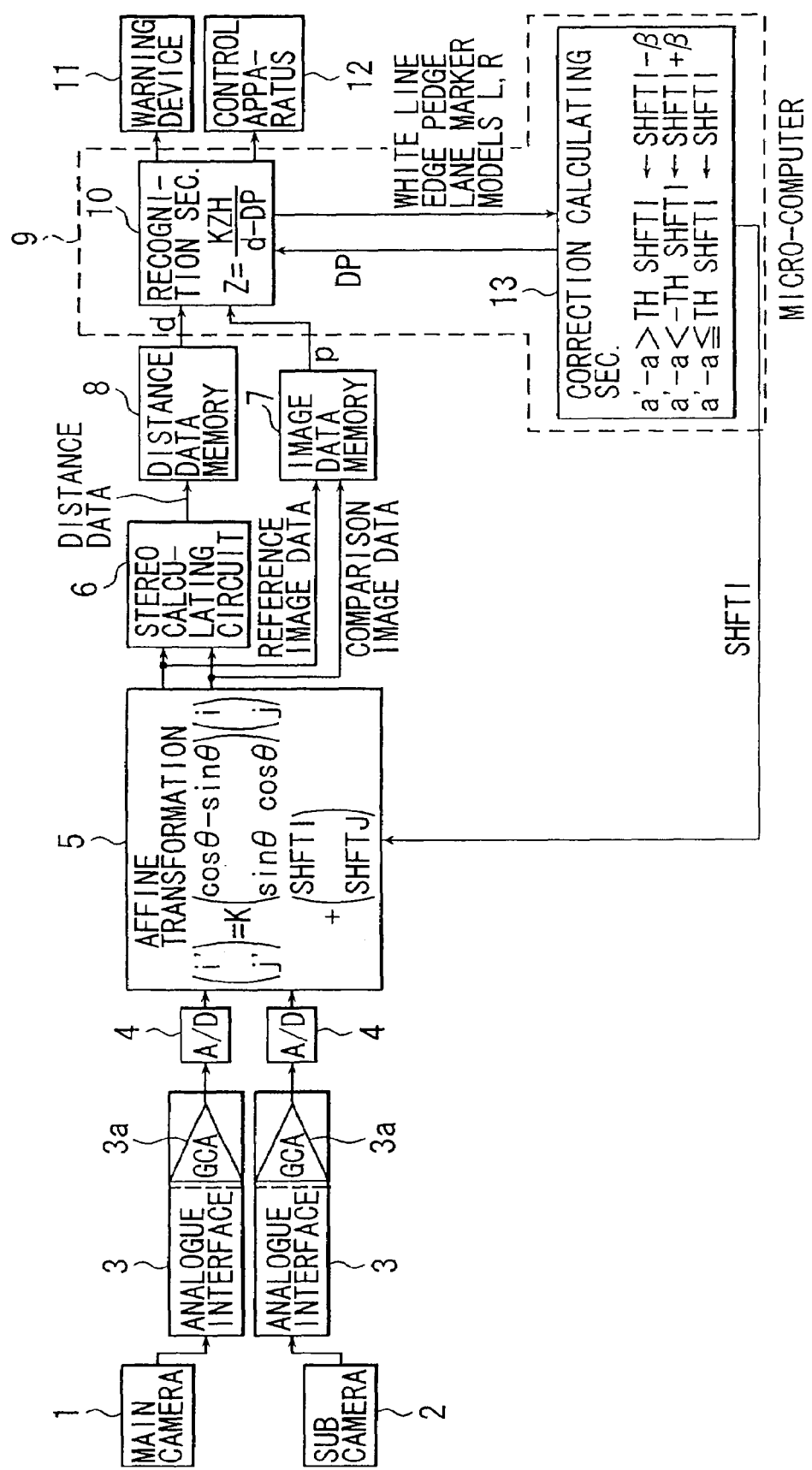
FIG. 6 is a block diagram showing a construction of a stereoscopic type vehicle surroundings monitoring apparatus according to a third embodiment of the present invention.

FIG. 6 is a block diagram showing the construction of a stereoscopic type vehicle surroundings monitoring apparatus according to the third embodiment. The block diagram is the same as that of FIG. 1 except for that the affine parameter SHFT1 calculated in the correction calculating section 13 is fed back to the correction circuit 5. Therefore, the components of the block diagram which are identical in both embodiments are denoted by identical reference numbers and are not described in detail.

Figure 2:
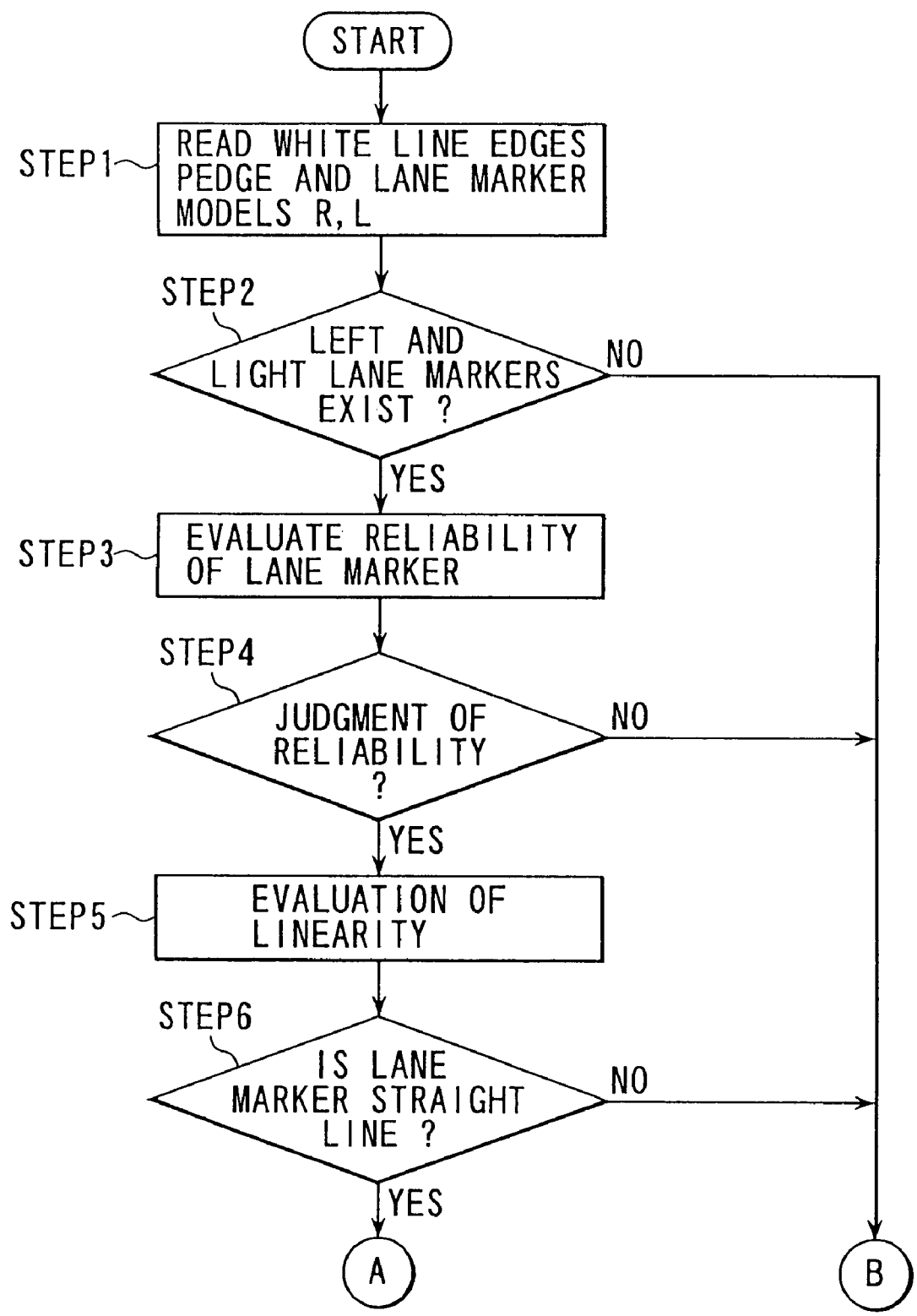
FIG. 2 is a flowchart showing steps for correcting a parallax according to a fist embodiment.
Figure 3:
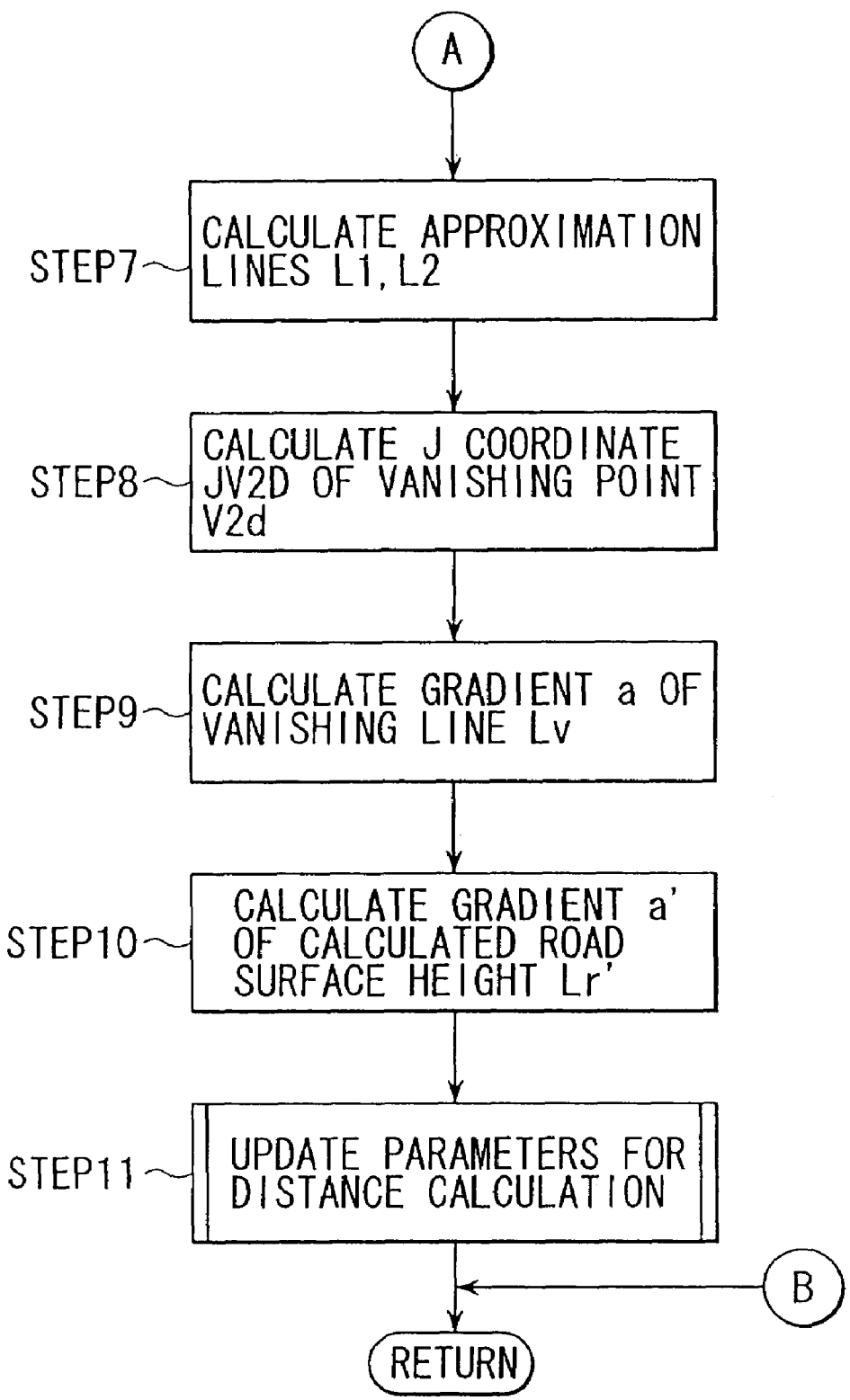
FIG. 3 is a flowchart continued from FIG. 2.

The steps of updating the affine parameter SHFT1 are the same as the flowcharts shown in FIGS. 2 and 3 in the first embodiment. What differs from the first embodiment is a step 11 of FIG. 3 concerning the updating of parameters for calculating the distance.

Figure 7:
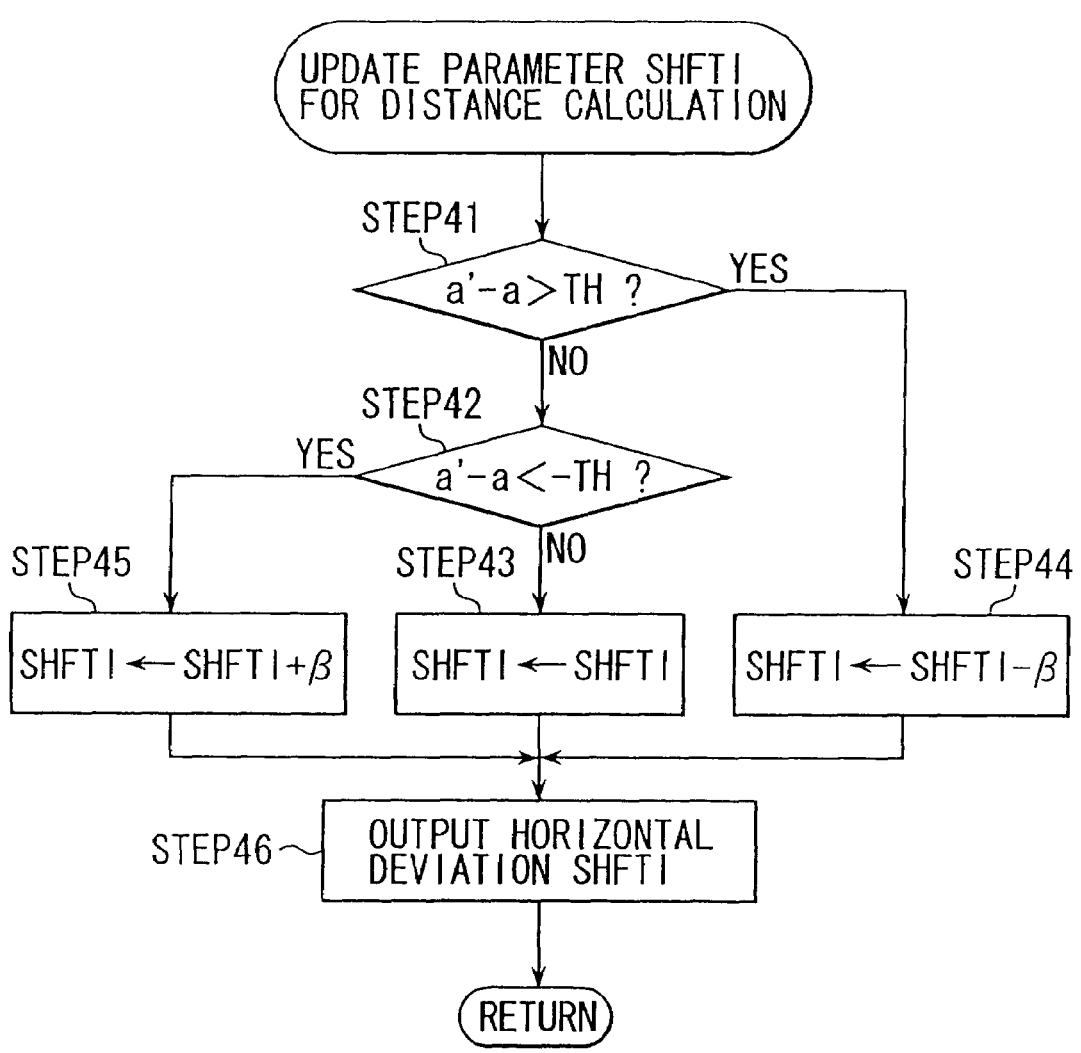
FIG. 7 is a flowchart showing steps for updating a parallax correction value SHFT1.

FIG. 7 is a flowchart showing steps for up-dating an affine parameter SHFT1 (parallax correction value) which represents the shift in the horizontal direction. First, at a step 41, it is judged whether or not the product of subtracting the gradient a of the actual road surface height Lr from the gradient a' of the calculated road surface height Lr', is larger than a positive threshold value TH. In case where the positive judgment (YES) is made at the step 41, the program goes to a step 44 where a specified value 1 is subtracted from the present value of the affine parameter SHFT1 and at a step 46 a smaller affine parameter SHFT1 than a previous one is outputted to the correction circuit 5. On the other hand, in case of NO at the step 41, the program goes to a step 42.

At the step 42, it is judged whether or not the subtraction a'-a is smaller than a negative threshold value −TH. If the judgment is YES at the step 42, the specified value β is added to the present value of the affine parameter SHFT1 at a step 45 and a larger affine parameter SHFT1 than a previous one is outputted to the correction circuit 5 (step 46). On the other hand, if the judgment is NO at the step 42, that is, if the subtraction a'-a is within a range from the negative threshold value −TH to the positive threshold value TH, it is judged that the affine parameter SHFT1 is proper to maintain the control stability and this value is not changed.

As described in the second embodiment, in case of a'>a, the calculated distance z1' should be adjusted so as to increase, in other words, the parallax d should be reduced. For that purpose, the value of the affine parameter SHFT1 should be established to be smaller than the previous one. That is, the affine parameter SHFT1 is updated such that the shift amount in the horizontal direction becomes small. Inversely, in case of a'<a, the calculated distance z1' should be adjusted to become small, in other words, the parallax d should be increased. For this purpose, the value of the affine parameter SHFT1 should be established to be larger than the previous one. That is, the affine parameter SHFT1 is updated such that the shift amount in the horizontal direction becomes large.

As described before, the feeback adjustment of the affine parameter SHFT1 (representing the shift in the horizontal direction) is made in parallel with the monitoring control. As a result, even in case where the horizontal deviation of the stereoscopic camera occurs, the affect of the deviation is offset by the affine parameter SHFT1, thereby an accurate parallax d can be obtained. As a result, highly accurate distance information can be obtained, whereby the reliability of the vehicle surroundings monitoring can be enhanced.

Fourth Embodiment

This embodiment relates to the method of regulating the established vanishing point V (IV, JV) used in the transformation formulas 3 and 4 for calculating coordinates (X, Y) showing the position of an object by utilizing the vanishing point V2d (IV2D, JV2D) which is shown in FIG. 13.

Figure 14:
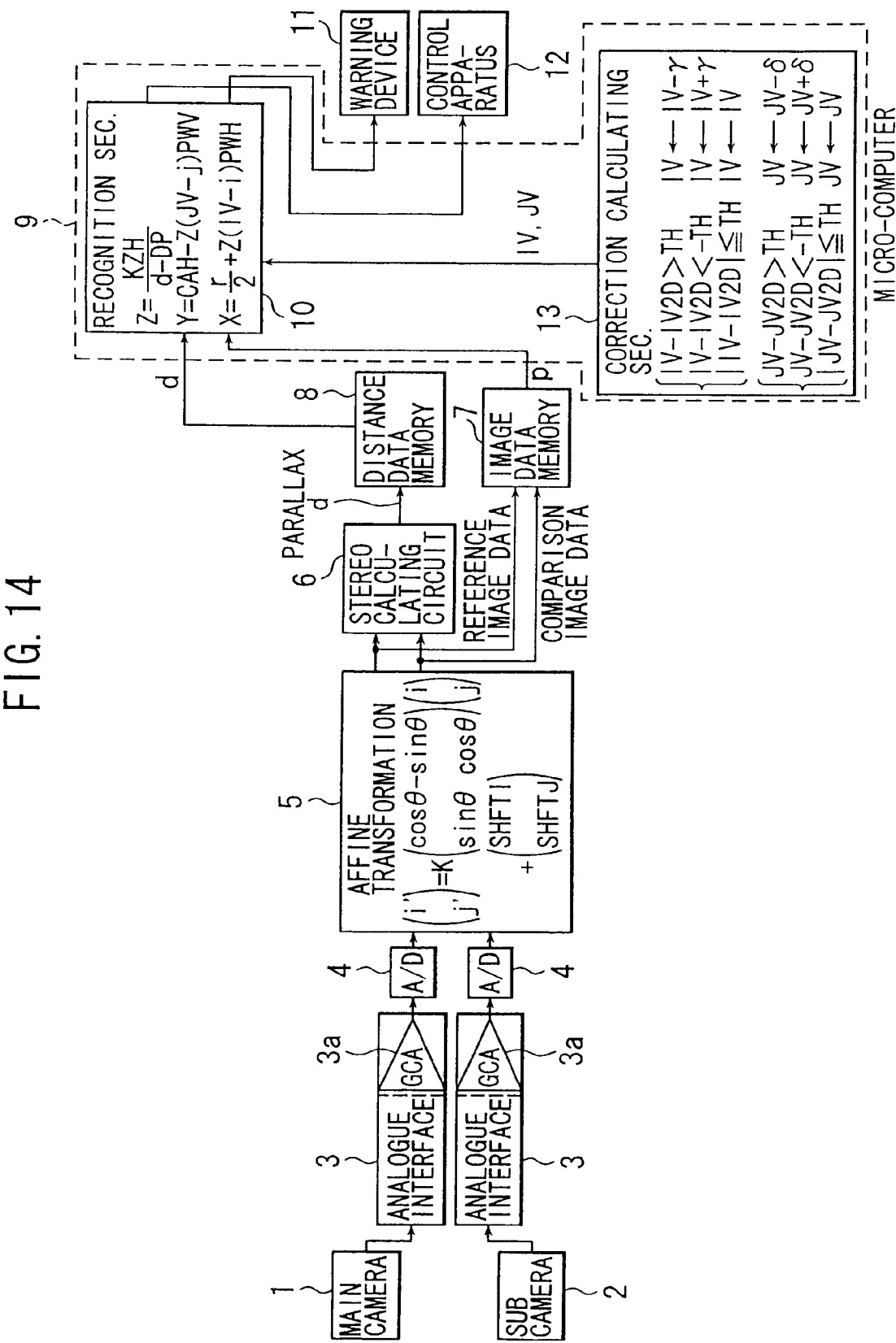
FIG. 14 is a block diagram showing a construction of a stereoscopic type vehicle surroundings monitoring apparatus according to a fourth embodiment of the present invention.

FIG. 14 is a block diagram showing a stereoscopic type vehicle surroundings monitoring apparatus according to a fourth embodiment. In the correction calculating section 13, the established vanishing point V(IV, JV) is updated based on the vanishing point V2d(IV2D, JV2D) in the reference image and the calculated vanishing point IV, JV is outputted to the recognition section 10. Except for this section, the block diagram is identical to that of FIG. 1. Therefore, identical reference numbers denoted in both embodiments are not described in detail.

Next, steps for updating the established vanishing point IV, JV will be described. First, according to the steps from the step 1 to the step 6 shown in the flowchart of FIG. 2, it is judged whether or not the reference image is in a condition suitable for calculating the vanishing point J2d (IV2D, JV2D).

Figure 15:
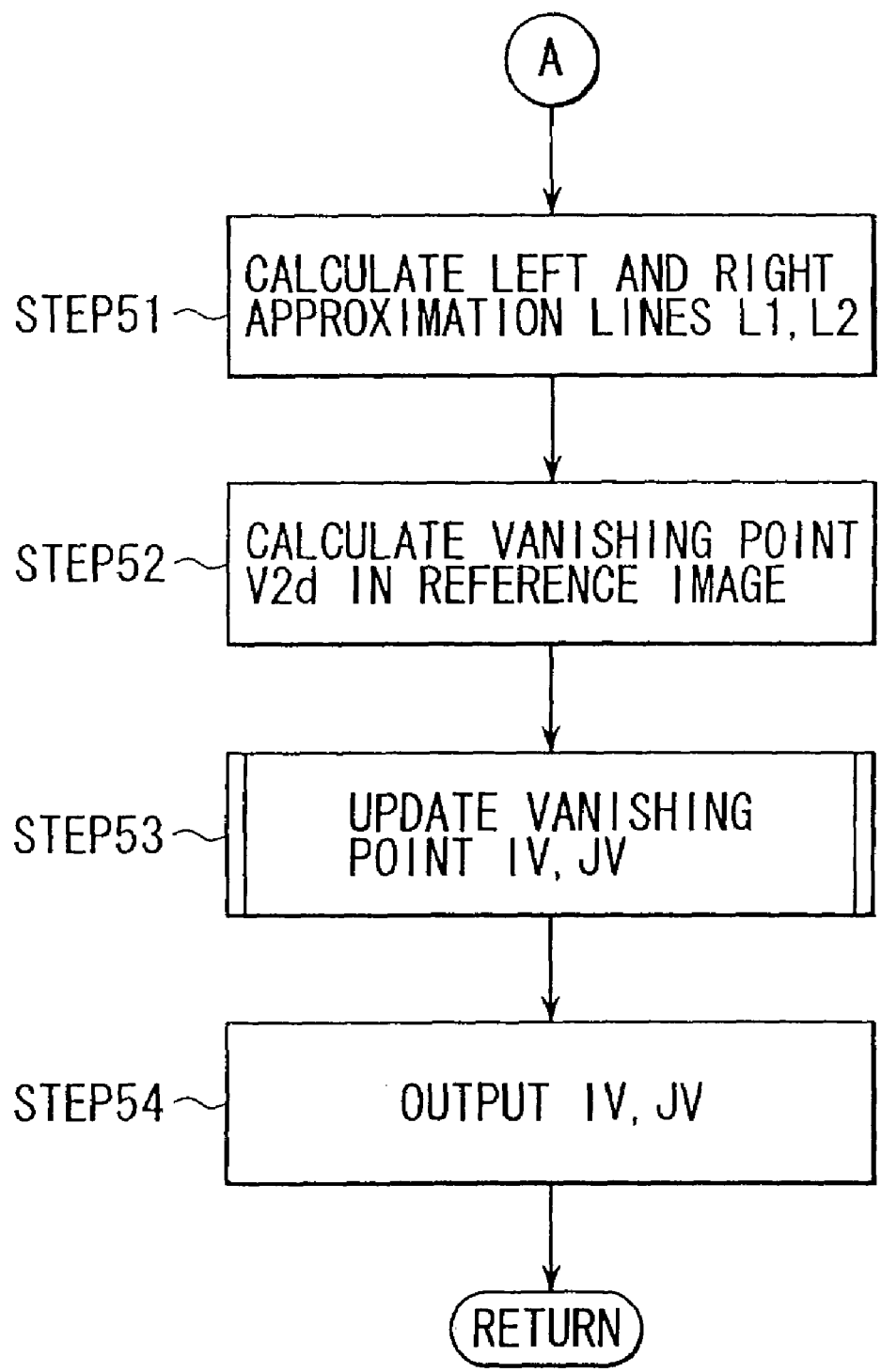
FIG. 15 is a flowchart showing steps continued from FIG. 2 according to a fourth embodiment.

FIG. 15 is a flowchart according to this embodiment continued from FIG. 2 and related to the updating process of the established vanishing point V (IV, JV). First, at a step 51, an approximation line L1 of a plurality of left white line edges Pedge1 existing within a specified distance range (for example, 0 to Z2) is calculated by the least square method (see FIG. 13). Also, in the same manner, at the step 51, an approximation line L2 of a plurality of right white line edges Pedge2 existing within the distance range is calculated by the least square method. After that, the program goes to a step 52 where a point of intersection of both approximation lines L1, L2, that is, a vanishing point J2d (IV2D, JV2D) of the reference image is calculated.

At a step 53 following the step 52, the established vanishing point V (IV, JV) which is employed in the formulas 3 and 4, is updated. First, the present value of an i coordinate value IV of the established vanishing point V is compared with an i coordinate value IV2D calculated at the step 52 and based on the result of the comparison, the vanishing point IV is updated by the following proportional control:

[Updating of Vanishing Point IV]

In case of $IV - IV2D > TH$ $\quad IV \leftarrow IV - \gamma$

In case of $IV - IV2D < -TH$ $\quad IV \leftarrow IV + \gamma$

In case of $|IV - IV2D| \leq TH$ $\quad IV \leftarrow IV$ where $\gamma$ is a constant $(0 < \gamma < 1)$.

That is, in case where the established vanishing point IV is larger than the vanishing point IV2D identified from the left and right lane markers in the image, this case means that the established vanishing point IV deviates rightward in the horizontal direction of the image. In this case, the established vanishing point IV is shifted leftward by a specified amount by subtracting the constant $\gamma$ from the present value of the established vanishing point IV. On the other hand, in case where the established vanishing point IV is smaller than the vanishing point IV2D, this case means that the established vanishing point IV deviates leftward in the horizontal direction of the image. In this case, the established vanishing point IV is shifted rightward by a specified amount by adding the constant $\gamma$ to the present value of the established vanishing point IV. Further, in order to make the control stable, in case where the difference (absolute value) between both is within a specified value TH, the established vanishing point IV is not changed.

Similarly, the vanishing point JV is updated according to the following proportional control by comparing the present value of the j coordinate value JV of the established vanishing point V with the j coordinate value JV2D of the calculated vanishing point V2d.

[Updating of Vanishing Point JV]

In case of $JV - JV2D > TH$ $\quad JV \leftarrow JV - \delta$

In case of $JV - JV2D < -TH$ $\quad JV \leftarrow JV + \delta$

In case of $|JV - JV2D| \leq TH$ $\quad JV \leftarrow JV$ where $\delta$ is a constant $(0 < \delta < 1)$.

That is, in case where the established vanishing point JV is larger than the vanishing point JV2D identified from the left and right lane markers in the image, this case means that the established vanishing point JV deviates upward in the vertical direction of the image. In this case, the established vanishing point JV is shifted downward by a specified amount by subtracting the constant $\delta$ from the present value of the established vanishing point JV. On the other hand, in case where the established vanishing point JV is smaller than the vanishing point JV2D, this case means that the established vanishing point JV deviates downward in the vertical direction of the image. In this case, the established vanishing point JV is shifted upward by a specified amount by adding the constant 5 to the present value of the established vanishing point JV. Further, in order to make the control stable, in case where the difference (absolute value) between both is within a specified value TH, the established vanishing point JV is not changed.

At a step 54 following the step 53, the vanishing point V (IV, JV) is outputted to the recognition section 10.

When the established vanishing point (IV, JV) is not proper, that value gradually comes close to a proper value by carrying out the aforesaid flowchart in each cycle. Specifically, this flow of control is performed in real time in parallel with the normal monitoring control and even when errors are caused in the present value of the established vanishing point (IV, JV), that value containing errors gradually converges to an optimum value. As a result, the position (X, Y) of an object can be calculated with high precision, thereby the reliability of vehicle surroundings monitoring can be enhanced.

[Application to Miscellaneous Monitoring Apparatuses]

In the embodiments described before, the method of calculating the vanishing point using the left and right lane markers projected on the image has been explained. This method is based on a general tendency that, in case of monitoring ahead of the vehicle, there exist lane markers extending in the front (depth) direction of the vehicle on left and right sides of the road and these lane markers are parallel with each other. In the specification, a linear object like lane markers which extend in the front direction in parallel with each other, and which is a base for calculating an vanishing point, is referred to as "reference object". The present invention can be broadly applied to miscellaneous monitoring system using picture images where the "reference object" is projected.

Figure 16:
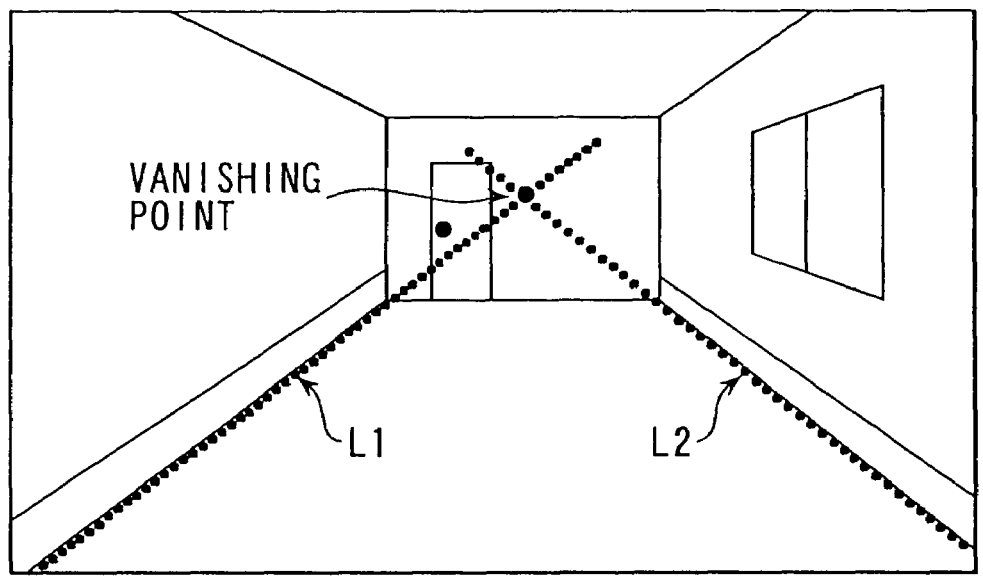
FIG. 16 is a diagram showing an example of an image of an indoor robot.

Taking an example, in case of applying to an indoor robot able to recognize surrounding situations, a boundary line constituted by a wall and a floor can be used as a "reference object". FIG. 16 is an example of an image taken by an indoor robot. Normally, in many cases, the boundary line of a left wall and a floor and the boundary line of a right wall and a floor extend in the depth direction of the image in parallel with each other. Accordingly, the correction of the vanishing point or the correction of distance can be done by using the left and right boundary lines.

Below, the outline of steps for adjusting the vanishing point making use of boundary lines.

First, a plurality of lines L1, L2 are detected based on the reference image. In the same way as the condition of white line edges described before, conditions with respect to brightness edges or parallax at the boundary portion between wall and floor are established before hand. Further, portions satisfying these conditions are recognized as boundary lines in the image and the linearity of these boundary lines is evaluated. After these processes, approximation lines L1, L2 are calculated. In another way, lines L1, L2 as "reference object" may be calculated by extracting dots (edge pixels at boundary portions) for forming lines in the image, using well-known Huff transformation and the like.

Next, it is judged that the lines L1, L2 are approximately parallel with each other based on the distance image. As described before, the position of respective areas constituting lines L1, L2 in real space can be identified based on the distance image. Accordingly, in case where two lines L1, L2 are detected, the parallelism of these lines L1, L2 is judged using the known method.

In case where the lines L1, L2 are parallel, a vanishing point is calculated from the point of intersection of these lines L1, L2. Further, a gradient a of lines L1, L2 is calculated respectively and coordinates of the vanishing point are calculated based on the gradient. Finally, the value of the vanishing point parallax is adjusted such that the coordinates of two calculated vanishing points agree with each other.

Figure 17:
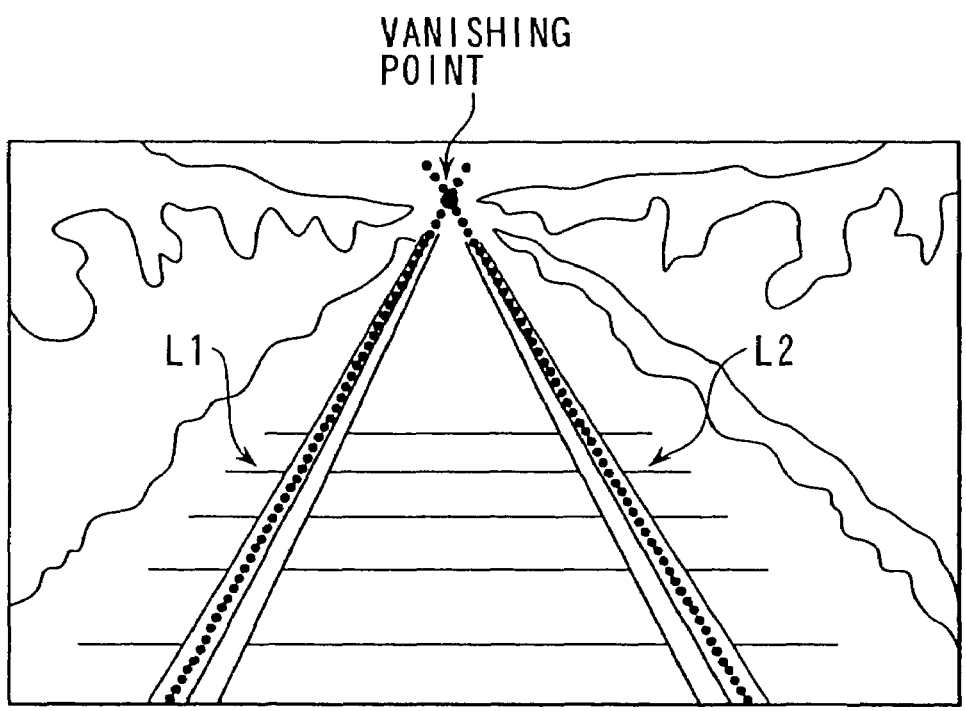
FIG. 17 is a diagram showing an example of an image of a scenery in front of a railway rolling stock.

Further, taking another example, in case of applying to the system for monitoring frontal situations of a railway rolling stock, left and right railways can be utilized as "reference object". FIG. 17 is an example of the image projecting the front scenery of the railway rolling stock. The left and right railways extend in the depth direction in parallel with each other. Accordingly, two parallel lines L1, L2 can be identified by making use of the left and right railways as "reference object", thereby the vanishing points can be adjusted by the method described above.

In summary, according to the present invention, parameters with respect to the calculation of three-dimensional information such as distance information, for example, a vanishing point parallax DP, an affine parameter SHFT1, a vanishing point (IV, JV) and the like, are corrected based on the actual vanishing point calculated from the left and right lane markers in the image. Accordingly, in case where a positional deviation of the stereoscopic camera occurs, since the parameters values are automatically adjusted so as to offset errors caused by that positional deviation, three-dimensional information (for example, distance information) with high accuracy can be obtained stably.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. A distance correcting apparatus of a surroundings monitoring system, comprising:
    stereo imaging cameras for producing a pair of stereoscopic images including a reference image and a comparison image;
    parallax calculating means for calculating a parallax for a pixel block including calculating a horizontal deviation amount between the reference and comparison images;
    distance calculating means for calculating a distance to an object based on said pixel block parallax and a vanishing point parallax;
    approximation line calculating means for calculating a plurality of approximation lines extending in the distance direction in parallel with each other based on said images;
    vanishing point calculating means for calculating a vanishing point of said images from a point of intersection of said approximation lines;
    reference object detecting means for calculating a lane marker model expressing a change of a road surface height with respect to distance;
    means for identifying a condition of change of an actual road surface height based on said vanishing point, and for identifying a condition of change of a calculated road surface height based on said lane marker model; and
    parameter correcting means for correcting said vanishing point parallax so that said condition of change of said calculated road surface height becomes close to said condition of change of said actual road surface height.

2. The distance correcting apparatus according to claim 1, wherein
    said parameter correcting means corrects vanishing point parallax by reducing a deviation between a first gradient indicating said condition of change of road surface height with respect to distance and a second gradient indicating said condition of change of actual road surface height.

3. The apparatus according to claim 2, wherein
    said vanishing point calculating means calculates an approximation line in said image plane for respective reference objects, when a plurality of reference objects are detected by said reference objects detecting means.

4. The apparatus according to claim 2, wherein
    said reference objects are lane markers on a road projected in said images and when left and right lane markers are detected on said road, and
    said vanishing point calculating means calculates an approximation line in said image plane for said respective left and right lane markers.

5. The apparatus according to claim 4, wherein
    said vanishing point calculating means calculates said approximation line based on said left and right lane markers existing within a specified distance range.

6. The apparatus according to claim 4, wherein
    said vanishing point calculating means judges whether or not a lane marker projected in said images is a straight line and when so judged, calculates said vanishing point of said images.

7. The apparatus according to claim 6, wherein said vanishing point calculating means evaluates a time-versus change of the position of a lane marker projected in said images, if said time-versus change is small, judges that said lane marker has a high reliability as lane markers, and calculates said vanishing point in said images.

8. A distance correcting apparatus of a surroundings monitoring system, comprising:

stereo cameras for producing a pair of stereoscopic images including a reference image and a comparison image;

transforming means for geometrically transforming said reference and comparison images based on a first parameter indicating a transference in the horizontal direction;

parallax calculating means for calculating a parallax based on said pair of images by calculating a horizontal deviation amount between the reference and comparison images;

distance calculating means for calculating a distance to an object based on said parallax and a first parameter for correcting said distance;

vanishing point calculating means for calculating a plurality of approximation lines extending in the distance direction in parallel with each other and calculating a vanishing point of said images from a point of intersection of said approximation lines;

reference object detecting means for calculating a lane marker model expressing a change of a road surface height with respect to distance;

means for identifying a condition of change of an actual road surface height based on said vanishing point, and for identifying a condition of change of a calculated road surface height based on said lane marker model; and parameter correcting means for correcting said first parameter based on said vanishing point so that said condition of change of said calculated road surface height becomes close to said condition of change of said actual road surface height.

9. The apparatus according to claim 8, wherein said parameter correcting means corrects said first parameter by reducing a deviation between a first gradient indicating said condition of change of road surface height with respect to distance and a second gradient indicating said condition of change of actual road surface height.

10. The apparatus according to claim 9, wherein said vanishing point calculating means calculates an approximation line in said image plane for respective reference objects, when a plurality of reference objects are detected by said reference objects detecting means.

11. The apparatus according to claim 9, wherein said reference objects are lane markers on a road projected in said images and when left and right lane markers are detected on said road, said vanishing point calculating means calculates an approximation line in said image plane for said respective left and right lane markers.

12. The apparatus according to claim 11, wherein said vanishing point calculating means calculates said approximation line based on said left and right lane markers existing within a specified distance range.

13. The apparatus according to claim 11, wherein said vanishing point calculating means judges whether or not a lane marker projected in said images is a straight line and and when so judged, calculates said vanishing point of said images.

14. The apparatus according to claim 13, wherein said vanishing point calculating means evaluates a time-versus change of the position of a lane marker projected in said images, if said time-versus change is small, judges that said lane marker has a high reliability as lane markers, and calculates said vanishing point in said images.

15. A vanishing point correcting apparatus of a surroundings monitoring system for taking images of a scenery in front of a vehicle and for obtaining a three-dimensional information of an object projected in said images by making use of an established vanishing point established beforehand, comprising:

reference object detecting means for detecting lane markers on a road projected in said images and for identifying a position of said lane markers on an image plane of said images;

vanishing point calculating means, when a left and right lane marker is detected on said road and it is judged that said lane marker projected in said images is a straight line, for calculating an approximation line in said image plane for said respective left and right lane markers and for calculating a vanishing point from a point of intersection of said approximation lines; and a vanishing point correcting means for correcting said established vanishing point so that said established vanishing point comes close to said vanishing point calculated by said vanishing point calculating means.

16. The apparatus according to claim 15, wherein said vanishing point calculating means evaluates a time-versus change of the position of a lane marker projected in said images, if said time-versus change is small, judges that said lane marker has a high reliability as lane markers, and calculates said vanishing point in said images.

* * * * *